United States Patent
Branam et al.

(10) Patent No.: US 8,131,587 B2
(45) Date of Patent: Mar. 6, 2012

(54) METHODS, COMMUNICATIONS DEVICES, AND COMPUTER PROGRAM PRODUCTS FOR ADDING DISPLAYED ADVERTISEMENT CONTACT DATA TO NETWORKED ADDRESS BOOKS

(75) Inventors: Michael Branam, Lawrenceville, GA (US); Bill Brown, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 921 days.

(21) Appl. No.: 12/127,474

(22) Filed: May 27, 2008

(65) Prior Publication Data

US 2009/0299859 A1 Dec. 3, 2009

(51) Int. Cl.
*G06Q 40/00* (2006.01)
(52) U.S. Cl. ..... 705/14; 705/1.1; 705/14.39; 705/14.55; 715/205; 725/34; 725/52
(58) Field of Classification Search ......... None
See application file for complete search history.

(56) References Cited

U.S. PATENT DOCUMENTS

| | | | |
|---|---|---|---|
| 6,177,931 B1 * | 1/2001 | Alexander et al. | 725/52 |
| 6,317,761 B1 * | 11/2001 | Landsman et al. | 715/205 |
| 7,362,463 B2 | 4/2008 | Silverbrook et al. | |
| 2003/0055725 A1 * | 3/2003 | Lee | 705/14 |
| 2008/0177626 A1 * | 7/2008 | Nguyen | 705/14 |
| 2009/0172728 A1 * | 7/2009 | Shkedi et al. | 725/34 |
| 2009/0182565 A1 * | 7/2009 | Erickson et al. | 705/1 |

FOREIGN PATENT DOCUMENTS

WO WO0135183 * 5/2001

OTHER PUBLICATIONS

Mutel, Glen. HSA Targets Young Families with First Foray into Interactive TV Ads. Precision Marketing (ZCZ) Jan. 4, 2002 p. 6.*

* cited by examiner

*Primary Examiner* — Charles Kyle
*Assistant Examiner* — Robert Niquette
(74) *Attorney, Agent, or Firm* — Cantor Colburn LLP (57) ABSTRACT

Method, communication device, and computer program products are provided for adding advertisement contact data to a networked address book. Advertisement data is accessed. The advertisement data is retrieved and parsed to determine if the advertisement data is in a proper format for a networked address book. The advertisement data is converted to the proper format, in response to determining that the advertisement data is not in the proper format. The advertisement data is transferred to the networked address book.

20 Claims, 5 Drawing Sheets

METHODS, COMMUNICATIONS DEVICES, AND COMPUTER PROGRAM PRODUCTS FOR ADDING DISPLAYED ADVERTISEMENT CONTACT DATA TO NETWORKED ADDRESS BOOKS

BACKGROUND

Exemplary embodiments relate to the field of network communication transmissions, and particularly to the field of network communication transmissions.

Internet protocol television (IPTV) service is a digital television delivery service, in which the digital television signal is delivered to residential users via a computer network infrastructure using the Internet Protocol. Typically, IPTV services are bundled with additional Internet services, such as Internet web access and voice over Internet protocol (VoIP). Subscribers and users of subscriber devices receive IPTV services via a computing device, such as a set top box, that is connected to a television or display device for the reception of a digital signal. Used in conjunction with an IP-based platform, the set top box allows for a subscriber or other user to access IPTV services and any additional services that are integrated within the IPTV service.

IPTV service platforms allow for an increase in the interactive services that can be provided to residential subscribers/users. As such, a subscriber/user can have access to a wide variety of content that is available via the IPTV service or the Internet. The IPTV infrastructure also allows the delivery of a variety of video content instantly to the subscribers/users.

Networked address books may be accessed via a network, such as an IPTV service platform. Networked address books contain various information that may be useful to a user. The user may update the networked address book as desired.

It is desirable to store and provide access to additional content in networked address books, and particularly to provide displayed advertisement contact data to networked address books via networks.

BRIEF SUMMARY

Exemplary embodiments include a method of adding advertisement contact data to a networked address book. Advertisement data is accessed. The advertisement data is retrieved and parsed to determine if the advertisement data is in a proper format for a networked address book. The advertisement data is converted to the proper format, in response to determining that the advertisement data is not in the proper format. The advertisement data is transferred to the networked address book.

Also, exemplary embodiments include a communications device. A memory stores a program for adding advertisement contact data. A processor is functionally coupled to the memory and is responsive to computer-executable instructions contained in the program. The computer-executable instructions are operative to access advertisement data, retrieve the advertisement data, and parse the advertisement data to determine if the advertisement data is in a proper format for a networked address book. The computer-executable instructions are operative to convert the advertisement data to the proper format, in response to determining that the advertisement data is not in the proper format, and transfer the advertisement data to the networked address book.

Further, exemplary embodiments include a computer program product, tangibly embodied on a computer readable medium, for adding advertisement contact data to a networked address book. The computer program product includes instructions for causing a computer to execute the above method.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
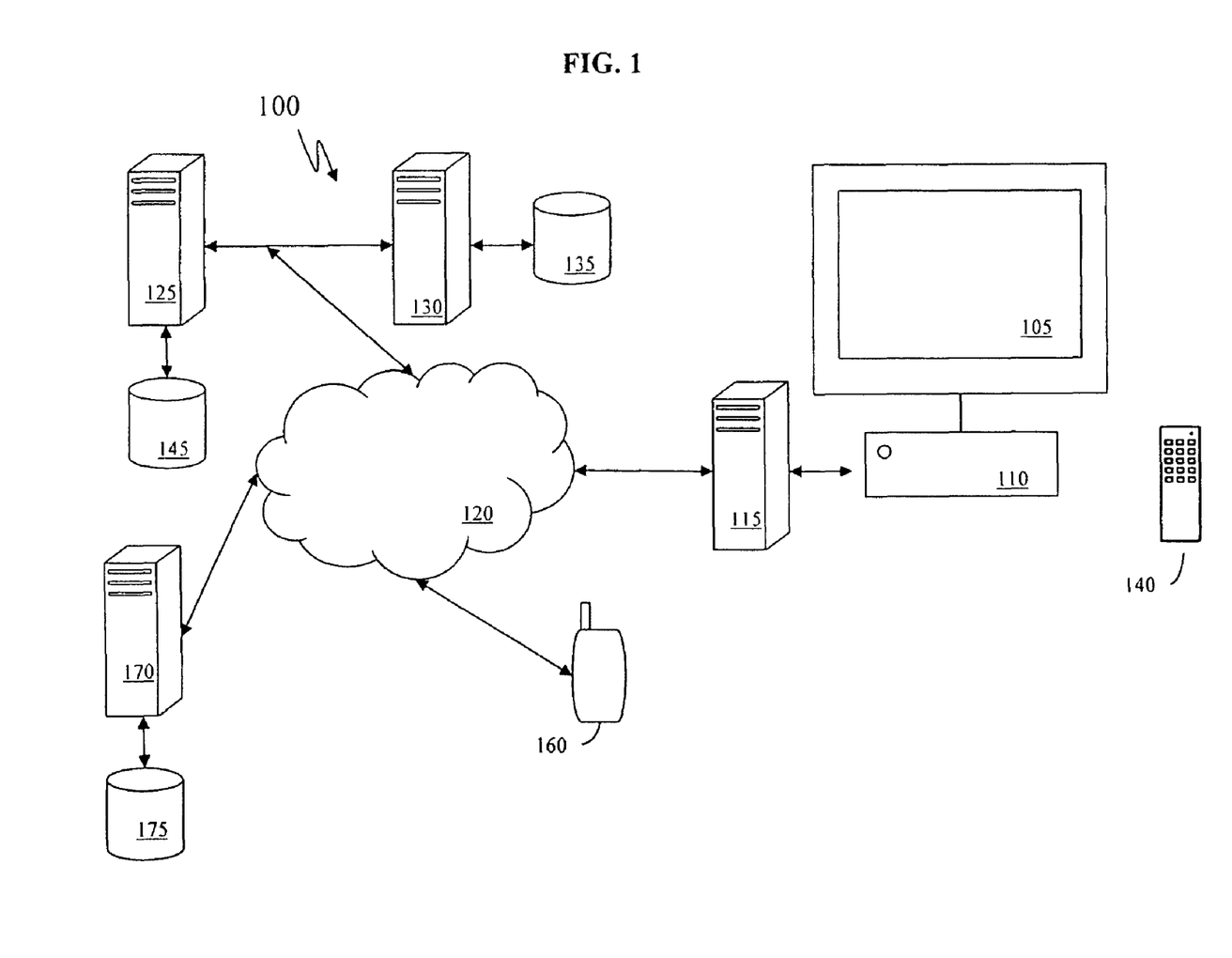
FIG. 1 illustrates a block diagram of a system in accordance with exemplary embodiments.

FIG. 1 illustrates a block diagram of a system 100 in accordance with exemplary embodiments. The system 100 provides an infrastructure through which users can access media (including video, audio, data, multimedia messaging, waypoints, etc.) through a communications device 105, such as an IPTV enabled television and a computing device 110, such as a set top box, configuration or any other type communication device. Although shown as separate devices, the communications device 105 and the set top box 110 may be integrated into one device. As an IPTV network, the system 100 also includes a remote controller 140 for inputting information and controlling the communications device 105 (e.g., a television). It is understood that in exemplary embodiments and implementations, the communications device 105 can be a variety of other communications devices, such as general purpose or laptop computers, wireless devices such as cellular telephones, portable computing device, digital music players (e.g., MP3 players), mobile devices, digital televisions, etc. In addition, a wireline public switched telephone network (PSTN) telephone, session initiation protocol (SIP) telephone, dual-mode mobile telephone, personal digital assistant (PDA), or other type of communications device may be included in the system 100 of FIG. 1.

According to exemplary embodiments, the system 100 includes the communications device 105 as discussed above, which can be an IP enabled television communicatively coupled to the set top box 110, which in turn may be communicatively coupled to a server 115 for accessing a network 120, such as but not limited to the Internet. It is understood that the server 115 (e.g., a residential gateway) may be omitted and the communications device 105 may directly access the network 120. Furthermore, residential gateways, such as a DSL modem, may be used to access the network 120. Indeed, access to the network 120 is not meant to be limited in any way. The network 120 may include circuit-switched and/or packet-switched technologies and devices, such as routers, switches, hubs, gateways, etc., for facilitating communications between the communications device 105 and servers 125, 130, 170. The network 120 may include wireline and/or wireless components utilizing, e.g., IEEE 802.11 standards for providing over-the-air transmissions of communications. The network 120 can be IP-based networks for communication between a customer service center and clients/users using the communication device 105 via a broadband connection.

Also, the network 120 may include wireline and/or wireless components utilizing standards for, e.g., multimedia messaging services (MMS). The network 120 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals (e.g., 160), supporting a wide range of standard interfaces.

According to exemplary embodiments, the network 120 facilitates transmission of media (e.g., images, video, data, multimedia messaging, etc.) from content services provider systems to customers/users via devices, such as the communications device 105, through a broadband connection.

In exemplary embodiments, the network 120 can be a managed IP network administered by a service provider, which can control bandwidth and quality of service for the communications discussed herein. The network 120 may be implemented in a wireless fashion, e.g., using wireless protocols and technologies, such as WiFi, WiMax, BLUETOOTH, etc. The network 120 can also be a packet-switched network, such as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may each include equipment for receiving and transmitting signals, such as a cell tower, a mobile switching center, a base station, and a wireless access point.

The system 100 can manage multiple accounts as established by particular users (e.g., by using the server 125). These accounts may then be used to provide access to media services as described further herein.

As further shown in FIG. 1, the server 125 (e.g., a host server) may be in communication with the server 130 (e.g., an authentication server) and the communications device 105 via the network 120. The server 125 (such as a media server, back-end server, or networked address book server) may be implemented using a high-speed processing device (e.g., a computer system) that is capable of handling high volume activities conducted via the communications device 105 and other network entities. According to exemplary embodiments, the server 130 may receive requests from the communications device 105 to access network services (e.g., to access a webpage). The server 125 may be implemented by a network service provider, a content service provider, a media service provider, an MMC, a webpage provider, a networked address book provider, or another enterprise. Similarly, the server 130 may be implemented using a high-speed processing device (e.g., a computer system) that is capable of handling high volume activities conducted via the communications device 105, and other network entities via the network 120. As a non-limiting example, the server 130 (e.g., as an authentication server) may receive requests from the communications device 105 either to establish a media services account or to access network services (e.g., to access media). As an authentication server, the server 130 may implement authentication software for restricting or controlling access to network services provided by the server 125 (or another server). The server 130 may be in communication with a customer identity system (CIS) database (such as a storage device 135), which stores user credentials (e.g., user names and passwords). In another exemplary embodiment, user credentials can be stored on the communications device 105.

In exemplary embodiments, the user can establish an account using devices associated with the user. For example, the communications device 105 can enable the establishment of an account that is managed by the provider enterprise of the server 125. As such, the communications device 105 may receive Internet services from the provider enterprise of the server 125, and an account record may be generated for the user of the communications device 105 that identifies the user and the account for which the services are provided. Account information and records may be stored in a storage device accessible by the server 125, such as a storage device 145.

Furthermore, exemplary embodiments are not limited to but are capable of being implemented in the system 100 illustrated in FIG. 1. Additionally, the servers 115, 125, 130, and 170 may be representative of numerous servers. The storages devices 135, 145, and a storage device 175 may be representative of numerous storages devices. Likewise, the network 120 may be representative of numerous networks. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

Figure 2:
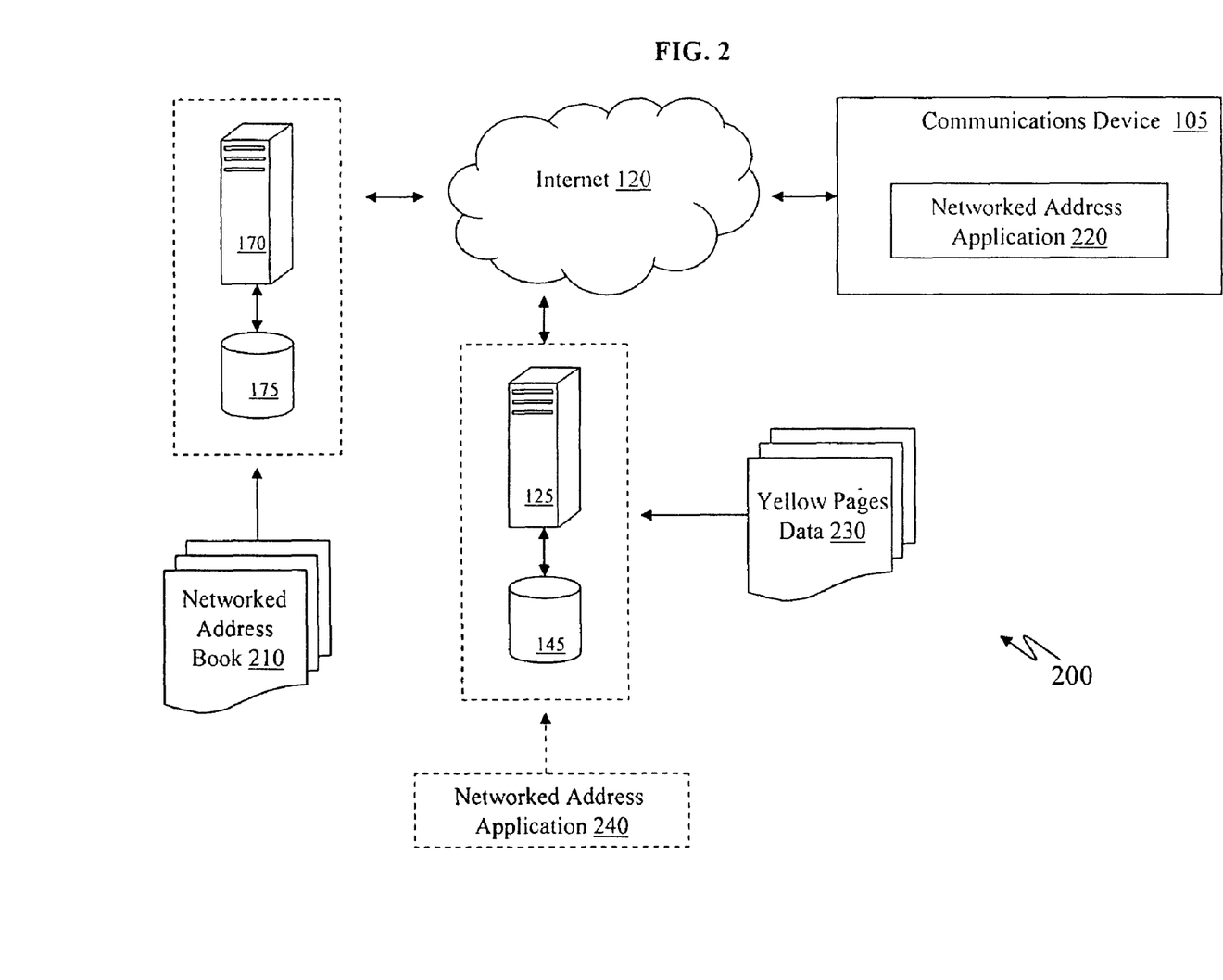
FIG. 2 illustrates a block diagram of a system for synchronizing displayed advertisement contact data to the networked address book in accordance with another exemplary embodiment.

FIG. 2 illustrates a block diagram of a system 200 for synchronizing displayed advertisement contact data to a networked address book 210 in accordance with exemplary embodiments. The server 170 and the storage device 175 are operatively connected to the network 120. The networked address book 210 is stored on and accessible from the server 170 and the storage device 175. A service provider may maintain services for the networked address book 210. The service provider can control access to the networked address book 210 by the server 170 and the storage device 175. The entries of the networked address book 210 may contain names, addresses, telephone numbers, annotations, etc. Further, the networked address book 210 may contain advertisement information. Advertisement information may include commercials. Also, advertisement information may include non-commercial information, such as public services information, personal information, and government information. Indeed, while the term advertisement is used herein, advertisement is used for illustrative purposes and is not meant to be limiting.

As a non-limiting example, a user may utilize the communications device 105 to search, e.g., the YELLOW PAGES™, for information about an enterprise. In one embodiment, the YELLOW PAGES™ may be hosted by a server, such as the sever 125 coupled to the storage device 145. The enterprise may be related to a person, a community, a charity, or a business. The communications device 105 communicates with the server 125 via the network 120, such as the Internet. The communications device 105 may access contact data (e.g., YELLOW PAGES™ data 230) maintained on the server 125 or the storage device 145 for a particular advertisement. The YELLOW PAGES™ data 230 may include various types of information related to the particular business being advertised. The various information may include addresses, telephone numbers, products, services, names, email addresses, etc.

As a non-limiting example, the user may view an advertisement for the business on the communications device 105 (e.g., a television) and may desire to have the YELLOW PAGES™ data 230 of the business included in his or her networked address book 210. The networked address book 210 may be stored on the server 170 (or the storage device 175). The server 170 may implement services for hosting the networked address book 210. In exemplary embodiments, a networked address application 220/240 may reside on the communications device 105, on the server 125, and/or on the server 170. The user may retrieve the YELLOW PAGES™ data 230, e.g., by downloading, cutting and pasting, selecting a button, or any other manner of retrieving, on the communications device 105. The networked address application 220/240 parses the YELLOW PAGES™ data 230 to determine if the formatting of the YELLOW PAGES™ data 230 is suitable for the networked address book 210. For example, the YELLOW PAGES™ data 230 may be in a structured query language (SQL). The networked address application 220/240 may convert the YELLOW PAGES™ data 230 from SQL to extensible markup language (XML). If the networked address application 220/240 determines that the format of the YELLOW PAGES™ data 230 is acceptable (e.g., in XML), no reformatting of the YELLOW PAGES™ data 230 may be necessary. According to exemplary embodiments, the communications device 105 transfers the YELLOW PAGES™ data 230 for the particular business to the server 170, and the YELLOW PAGES™ data 230 can be stored as an entry in the networked address book 210 on the server 170 (or the storage device 175) in accordance with exemplary embodiments.

As a non-limiting example, address information of the business may be inserted in an address field of the networked address book 210. Similarly, other information (such as, telephone numbers, products, services, names, email addresses, and the like) may be stored in the corresponding fields of the networked address book 210. In exemplary embodiments, the networked address application 220/240 may extract the various pieces of information from the YELLOW PAGES™ data 230 and add the information to the corresponding fields of the networked address book 210, so that the contact data related to the business of YELLOW PAGES™ data 230 can be stored in the networked address book 210.

Figure 3:
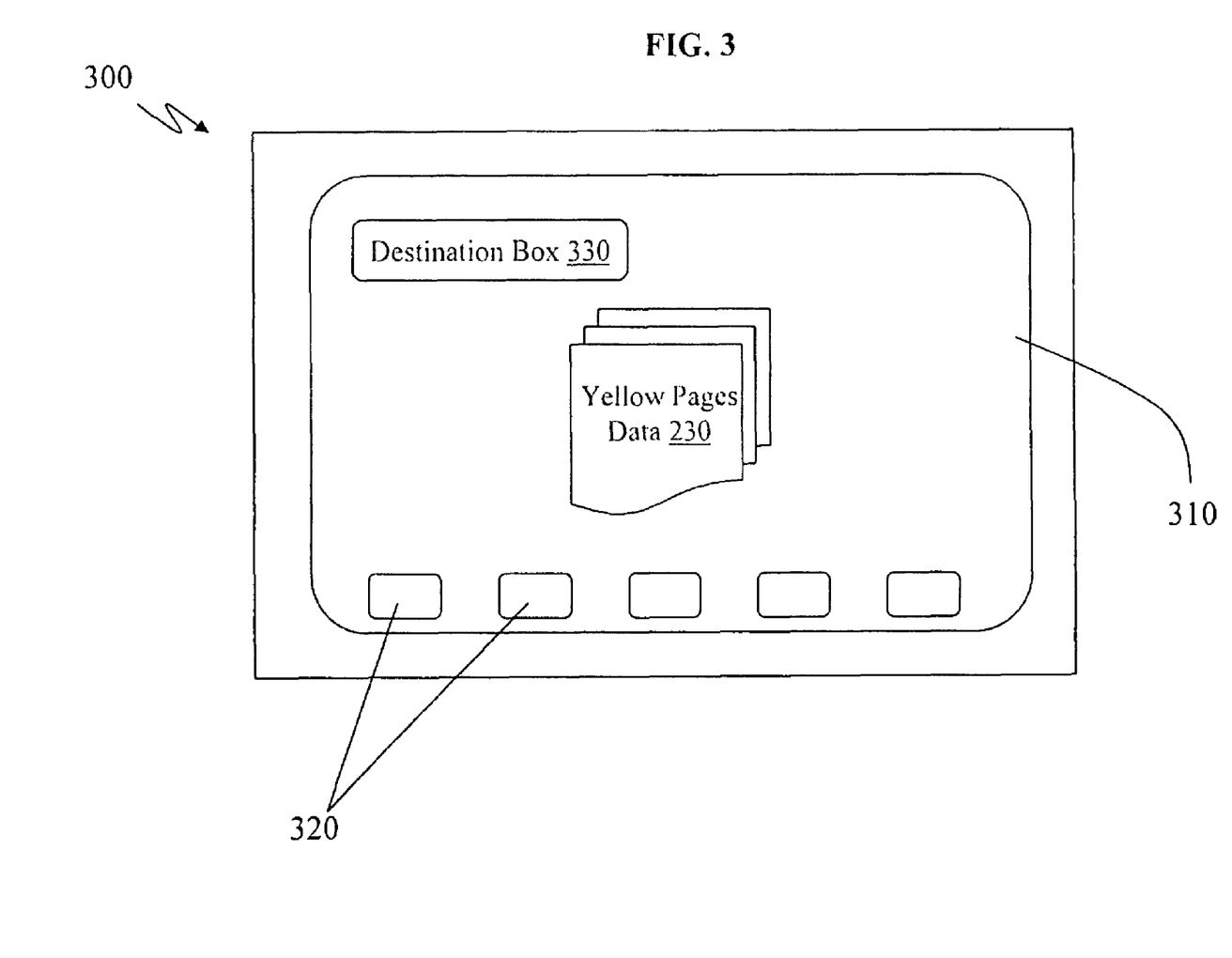
FIG. 3 illustrates a non-limiting example of a screen that may depict advertisements in accordance with exemplary embodiments.

FIG. 3 illustrates a non-limiting example of a screen 300 that may depict advertisements in accordance with exemplary embodiments. In exemplary embodiments, an advertisement screen 310 (displayed, e.g., on the communications device 105) may illustrate, e.g., advertisements of businesses in the YELLOW PAGES™. The YELLOW PAGES™ data 230 of a particular business may be viewed on the advertisement screen 310. As a non-limiting example, the user may select a button (such as one of buttons 320 illustrated in FIG. 3) that may be labeled "Push to Address Book". The "Push to Address Book" button of the buttons 320 can be used to transfer the YELLOW PAGES™ data 230 to the networked address book 210 on the server 170 in accordance with exemplary embodiments. Also, the YELLOW PAGES™ data 230 may be extracted by downloading or cutting and pasting.

A unique identification of the networked address book 210 may be input in a destination box 330 of the advertisement screen 310. The unique identification may be a URL, an IP address, or any data that uniquely corresponds to the networked address book 210 stored on the server 170. The networked address application 220/240 may parse the YELLOW PAGES™ data 230 to determine the format of the data in accordance with exemplary embodiments. The advertisement data on (or related to) the advertisement screen 310 (which may be the YELLOW PAGES™ data 230) can be pushed (i.e., transferred) to the server 170 for storage in the networked address book 210. The server 125 or the communications device 105 may transfer the YELLOW PAGES™ data 230 to the server 170. In accordance with exemplary embodiments, the networked address application 220/240 may run in the background (e.g., on the server 125, the communications device 105, and/or the server 170) to facilitate transfer of the advertisement data of the screen 310 to the networked address book 210 on the server 170.

Figure 4:
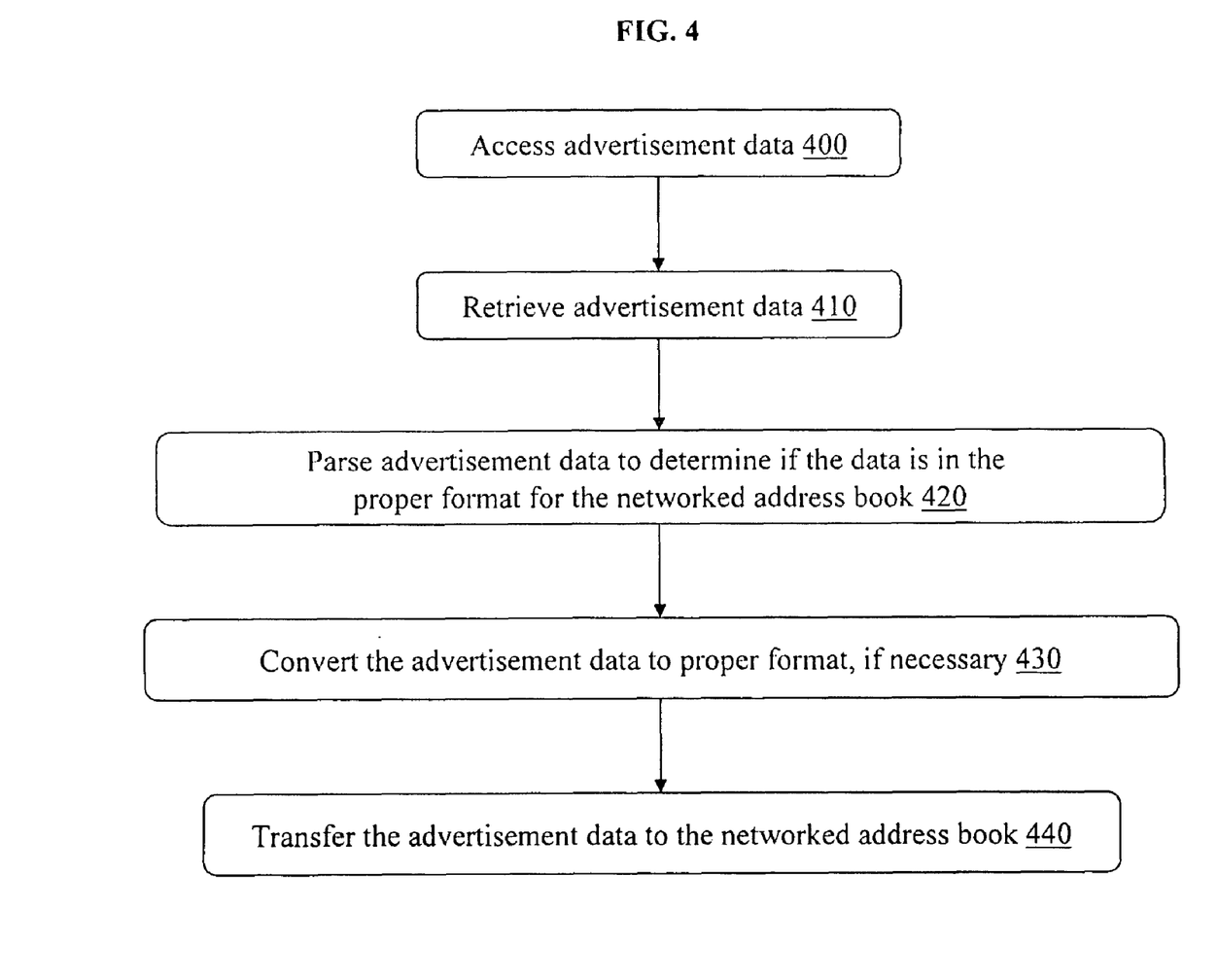
FIG. 4 illustrates a method of adding contact data from an advertisement to the networked address book in accordance with exemplary embodiments.

FIG. 4 illustrates a method of adding contact data from an advertisement to the networked address book 210, such that the contact data is synchronized to the networked address book 210. Advertisement data (e.g., in the YELLOW PAGES™) may be accessed using, for example, the communications device 105 at step 400. For example, a user of the communications device 105 may input a URL address corresponding to the business being advertised on the advertisement screen 310. Also, the user may click on a pop up screen being advertised on the advertisement screen 310. The user may utilize a search engine to locate a particular enterprise advertised on the advertisement screen 310.

The advertisement data (e.g., the YELLOW PAGES™ data 230) may be retrieved by downloading, cutting and pasting, and/or selecting a button like "Push to Networked Address Book" at step 410. The advertisement data may be parsed (e.g., by the networked address application 220/240) to determine if the advertisement data is in the proper format at step 420. As a non-limiting example, the networked address application 220/240 can extract the contact data from the YELLOW PAGES™ data 230 in accordance with exemplary embodiments. If necessary, the advertisement data may be converted into the proper format by the networked address application 220/240 at step 430.

The advertisement data may be transferred to the networked address book 210 by, e.g., the communications device 105 at step 440. In exemplary embodiments, the user may input the destination to transfer the YELLOW PAGES™ data 230 in the destination box 330. The destination corresponds to the networked address book 210. The networked address application 220/240 may recognize the destination and determine the appropriate format for the destination, such as the networked address book 210. If needed, the networked address application 220/240 converts the YELLOW PAGES™ data 230 into the proper format for the destination.

Further, in exemplary embodiments, the networked address application 220/240 may parse the advertisement data and locate advertisement information relating to a name, a telephone number, a product, a service, an address, and/or an email address. The networked address application 220/240 may copy the located information and transfer the located information to the networked address book 210.

Figure 5:
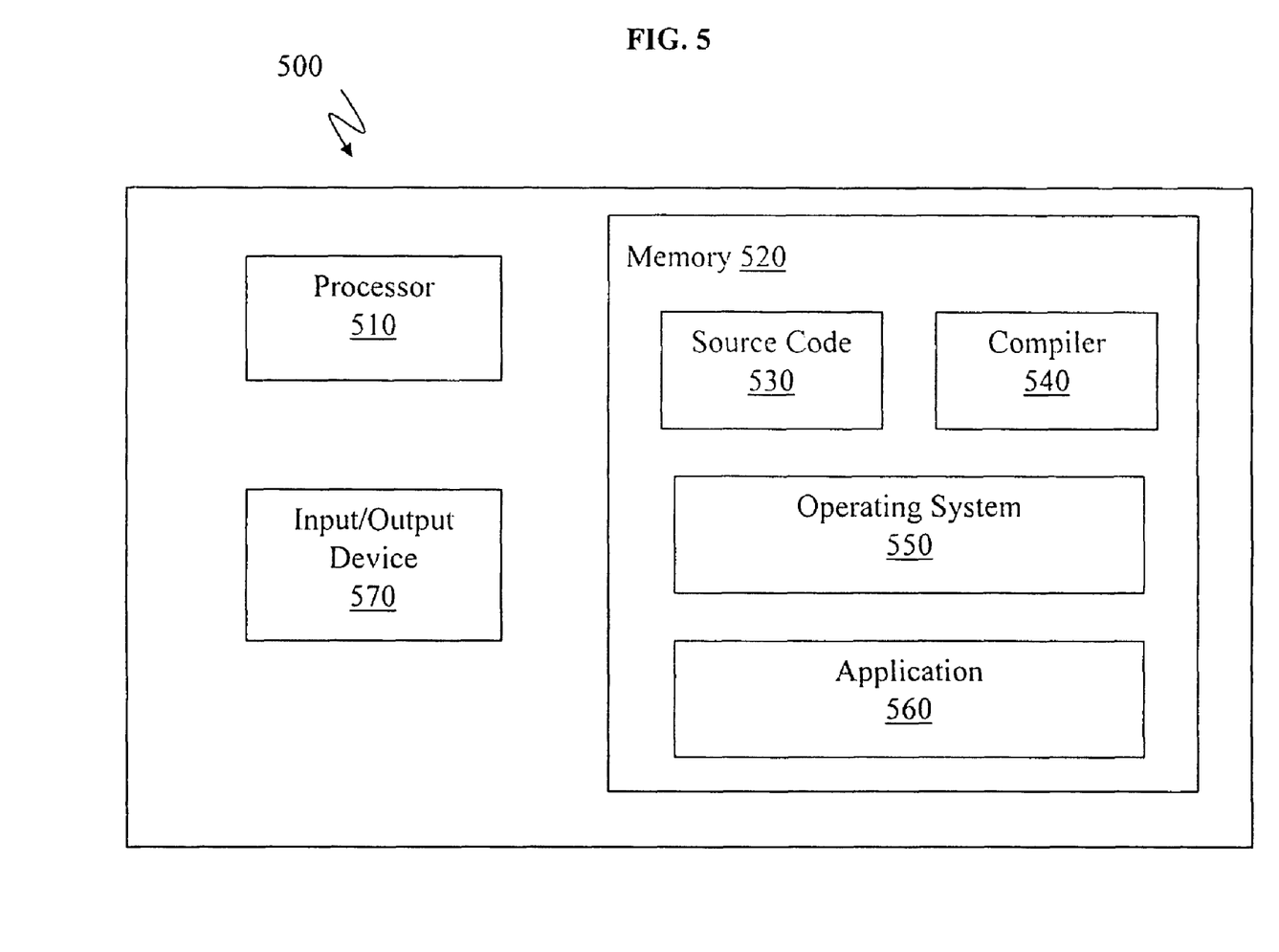
FIG. 5 illustrates an example of a computer having capabilities that may be included in exemplary embodiments.

FIG. 5 illustrates an example of a computer 500 having capabilities, which may be included in exemplary embodiments. Various methods and systems discussed above may also utilize the capabilities of the computer 500. One or more of the capabilities of the computer 500 may be incorporated in the communications device 105, the set top box 110, the servers 115, 125, 130, 170, and/or any element discussed herein.

The computer 500 includes, but is not limited to, PCs, workstations, laptops, PDAs, palm devices, Internet protocol enabled televisions, set top boxes, servers, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and an application 560 (which may be one or more applications) of the exemplary embodiments. As illustrated, the application 560 comprises numerous functional components for implementing the features and operations of the exemplary embodiments. The application 560 of the computer 500 may represent the various applications referred to herein, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments is applicable on all other commercially available operating systems.

The application 560 may be a source program, executable program (object code), script, or any other entity comprising a set of instructions to be performed. When the application 560 is a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, NET, and the like.

The I/O devices 570 may include input devices such as, for example but not limited to, a mouse, keyboard, scanner, microphone, camera, etc. Furthermore, the I/O devices 570 may also include output devices, for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such at the Internet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, and may be buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices and systems discussed herein, and it is understood that additional software and hardware components may be included in the various devices and systems discussed in exemplary embodiments.

Communication devices, networks, systems, Internet devices, PCs, PDAs, mobile devices, communication vehicle devices, servers, set top boxes, etc., comprise all the hardware, software, modules, applications, and interfaces necessary to operate and function as described herein.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for adding advertisement contact data to a networked address book, comprising:
   accessing advertisement data displayed on a television to a user;
   while the advertisement data is being displayed on the television for the user, displaying a selectable button on the television in which the selectable button is configured to transfer the advertisement data to the networked address book responsive to the selectable button being selected by the user;
   retrieving the advertisement data displayed on the television;
   parsing the advertisement data to determine if the advertisement data is in a proper format for the networked address book;
   converting the advertisement data to the proper format, in response to determining that the advertisement data is not in the proper format; and
   causing by the television the advertisement data to be transferred to the networked address book.

2. The method of claim 1, wherein the advertisement data is converted into the proper format based on extensible markup language.

3. The method of claim 1, wherein the advertisement data is accessed via an internet by the user.

4. The method of claim 1, wherein the advertisement data comprises a name, a telephone number, a product, a service, an address, and an email address.

5. The method of claim 1, wherein retrieving the advertisement data comprises:
   parsing the advertisement data;
   locating information associated with the advertisement data comprising a name, a telephone number, a product, a service, an address, and an email address; and
   copying the information associated with the advertisement data.

6. The method of claim 5, wherein the information associated with the advertisement data is transferred to the networked address book.

7. The method of claim 1, further comprising:
   displaying a destination box on the television to the user in which the destination box corresponds to the advertisement data being displayed on the television, wherein the destination box is configured to receive input of a unique identification of the networked address book;
   receiving a destination corresponding to the networked address book; and
   transferring the advertisement data to the destination corresponding to the networked address book.

8. A communications device being a television, comprising:
   memory for storing a program for adding advertisement contact data; and
   a processor, functionally coupled to the memory, the processor being responsive to computer-executable instructions contained in the program and operative to:
   access advertisement data displayed on a display to a user;
   while the advertisement data is being displayed for the user, display a selectable button on the display in which the selectable button is configured to transfer the advertisement data to a networked address book responsive to the selectable button being selected by the user;

retrieve the advertisement data;

parse the advertisement data to determine if the advertisement data is in a proper format for the networked address book;

convert the advertisement data to the proper format, in response to determining that the advertisement data is not in the proper format; and transfer the advertisement data to the networked address book.

9. The communication device of claim 8, wherein the advertisement data is converted into the proper format based on extensible markup language.

10. The communication device of claim 8, wherein the advertisement data comprises a name, a telephone number, a product, a service, an address, and an email address.

11. The communication device of claim 8, wherein the advertisement data is retrieved by:

parsing the advertisement data;

locating information associated with the advertisement data comprising a name, a telephone number, a product, a service, an address, and an email address; and copying the information associated with the advertisement data.

12. The communication device of claim 11, wherein the information associated with the advertisement data is transferred to the networked address book.

13. A computer program product, tangibly embodied on a non-transitory computer readable medium, for adding advertisement contact data to a networked address book, the computer program product including instructions for causing a television to execute a method, comprising:

accessing advertisement data displayed on the television to a user;

while the advertisement data is being displayed on the television for the user, displaying a selectable button on the television in which the selectable button is configured to transfer the advertisement data to the networked address book responsive to the selectable button being selected by the user;

retrieving the advertisement data displayed on the television;

parsing the advertisement data to determine if the advertisement data is in a proper format for the networked address book;

converting the advertisement data to the proper format, in response to determining that the advertisement data is not in the proper format; and transferring the advertisement data to the networked address book.

14. The computer program product of claim 13, wherein the advertisement data is converted into the proper format based on extensible markup language.

15. The computer program product of claim 13, wherein the advertisement data is accessed via an internet.

16. The computer program product of claim 13, wherein the advertisement data comprises a name, a telephone number, a product, a service, an address, and an email address.

17. The computer program product of claim 13, wherein retrieving the advertisement data comprises:

parsing the advertisement data;

locating information associated with the advertisement data comprising a name, a telephone number, a product, a service, an address, and an email address; and copying the information associated with the advertisement data.

18. The computer program product of claim 17, wherein the information associated with the advertisement data is transferred to the networked address book.

19. The computer program product of claim 13, further comprising:

receiving a destination corresponding to the networked address book; and transferring the advertisement data to the destination corresponding to the networked address book.

20. The computer program product of claim 13, wherein the advertisement data is contained in a web page.

* * * * *